United States Patent
Wu

(10) Patent No.: US 7,545,725 B2
(45) Date of Patent: Jun. 9, 2009

(54) OPTICAL READING APPARATUS CAPABLE OF CORRECTING ABERRATION

(75) Inventor: Fung-Hsu Wu, Tao-Yuan Hsien (TW)

(73) Assignee: Daxon Technology Inc., Gueishan, Tao-Yuan Hsien (TW)

( * ) Notice: Subject to any disclaimer, the term of this patent is extended or adjusted under 35 U.S.C. 154(b) by 562 days.

(21) Appl. No.: 11/277,949

(22) Filed: Mar. 30, 2006

(65) Prior Publication Data

US 2007/0127347 A1  Jun. 7, 2007

(30) Foreign Application Priority Data

Dec. 6, 2005    (TW) .............................. 94142962 A
Jan. 3, 2006    (TW) .............................. 95100235 A

(51) Int. Cl.
*G11B 7/00* (2006.01)

(52) U.S. Cl. .................... 369/112.02; 369/112.22; 369/112.23; 369/44.23

(58) Field of Classification Search ............ None
See application file for complete search history.

(56) References Cited

U.S. PATENT DOCUMENTS

| | | | |
|---|---|---|---|
| 6,091,549 A | 7/2000 | McDonald | |
| 2002/0067672 A1 | 6/2002 | Yanagawa et al. | |
| 2002/0097504 A1 | 7/2002 | Kitamura | |
| 2003/0202451 A1 | 10/2003 | Kimura et al. | |
| 2004/0042356 A1 | 3/2004 | Kato et al. | |
| 2004/0047268 A1* | 3/2004 | Yanagisawa et al. ... | 369/112.02 |
| 2004/0125711 A1 | 7/2004 | Sato et al. | |
| 2004/0130989 A1 | 7/2004 | Hashimoto et al. | |
| 2006/0114797 A1* | 6/2006 | Jung et al. ............. | 369/112.01 |

FOREIGN PATENT DOCUMENTS

| | | |
|---|---|---|
| CN | 101025947 A | 8/2007 |
| JP | H9-320103 | 12/1997 |
| JP | 2000-132854 | 5/2000 |
| JP | 2001-209966 | 8/2001 |
| JP | 2002-109776 A | 4/2002 |
| JP | 2002-279677 | 9/2002 |
| JP | 2004-296082 | 10/2004 |
| TW | I240261 | 9/2005 |
| TW | I269931 | 1/2007 |
| TW | I287223 | 9/2007 |

* cited by examiner

*Primary Examiner*—Muhammad N. Edun
(74) *Attorney, Agent, or Firm*—Winston Hsu

(57) ABSTRACT

An optical reading apparatus with aberration-correcting functionality includes a light source, a lens, a liquid crystal layer and an electrode set. The light source of the optical reading apparatus emits light, which is converged onto a storing medium by the lens for accessing data stored in the storage medium. The liquid crystal layer is disposed in an optical path between the light source and the storage medium. The electrode set provides a variable electrical field across the liquid crystal layer for changing the refractive index of the liquid crystal layer. Aberration of the optical reading apparatus can thus be corrected.

20 Claims, 20 Drawing Sheets

|  | CD | DVD | Blu-ray | HD-DVD |
|---|---|---|---|---|
| Single layer / Double layer | Single layer | Single layer / Double layer | Single layer / Double layer | Single layer / Double layer |
| Capacity(GB) | 0.68 | 4.7/9.4 | 25/50 | 15/30 |
| Wavelength(nm) | 780 | 650 | 405 | 405 |
| NA | 0.45 | 0.6 | 0.85 | 0.6 |
| Thickness($\mu$m) | 1.2 | 0.6 | 0.1 | 0.6 |

Fig. 1 Prior Art

OPTICAL READING APPARATUS CAPABLE OF CORRECTING ABERRATION

BACKGROUND OF THE INVENTION

1. Field of the Invention

The present invention relates to an optical reading apparatus, and more particularly, to an optical reading apparatus capable of correcting coma aberration.

2. Description of the Prior Art

Lenses are used for converging, refracting or transmitting light in many optical systems. Ideally, aberration of an image can be reduced by proper lens design. However, the unavoidable aberration, caused by material itself or manufacturing factors in manufacturing processes, causes image deviations. Certain unpredictable factors during operations, i.e. the data surface of the disk having a tilt angle caused by disk misplacement, can also aggravate aberrations in the optical system and thus affect display quality or data access.

Certain major aberrations in an optical system are spherical aberration, coma aberration, astigmatism, curvature of field, etc. Coma aberration in an optical system refers to monochromatic aberration inherent to certain optical designs, or due to imperfection in the lens or a tilted storage medium. Coma aberration results in off-axis images resembling coma tails. Coma aberration represents a spherical aberration of a lens when the incident light is off-axis, and often occurs when the data surface of the storage medium has a large tilt angle with respect to the incident light. Coma aberration is most significant at image rims and can be represented by the following formula:

$$\text{coma aberration} = \left(\frac{n^2-1}{2n^3} * d * \frac{NA^3}{\lambda}\right)\left(\theta * \frac{\pi}{180}\right)$$

where d is the thickness of the disk substrate, NA is the numerical aperture (NA) of the optical pick-up, $\lambda$ is the wavelength of incident laser, $\theta$ is the tilt angle between the incident laser and the disk substrate, and n is the refractive index of the light in the disk substrate.

With the development of technology, storage media with higher storage capacity is required. FIG. 1 shows a table listing certain specifications of similar storage media available in the market. Compared to the conventional compact disc (CD) and the digital versatile disc (DVD), Blu-ray disk (BD) and the high density digital versatile disc (HD-DVD) have the potential to become the future storage media for their higher storage capacity. BD and HD-DVD drives access data using a laser of a wavelength of 405 nm. Besides, a BD drive further adopts a high NA OPU (optical pick up) for increasing the data capacity and the 0.1 mm thick cover layer.

Coma aberration is inversely proportional to wavelength and proportional to the thickness of the disk substrate and to the third power of NA. Therefore, the tolerances of tilted angle $\theta$ in a BD system are largely reduced by using a 0.1 mm thick cover layer. Coma aberration reduces the optical quality more seriously in an HD-DVD system.

A schematic diagram of a prior art optical system 20 disclosed in U.S. Publication 2004/0042356 is shown in FIG. 2. The optical system 20 includes a storage medium 21, an optical pick-up 22, a spindle motor 24, a tilt corrector 26, a land pre-pits (LPP) signal generator 27, a radio frequency (RF) signal generator 28, and a tilt correction calculator 29. An optical sensor disposed on the optical pick-up 22 can transmit signals measured from the storage medium 21 to the LPP signal generator 27 and the RF signal generator 28. The tilt correction calculator 29 generates a tilt correction value based on LPP signals and RF signals respectively received from the LPP signal generator 27 and the RF signal generator 28, and sends the tilt correction value to the tilt corrector 26. Therefore, the optical system 20 can adjust the angle of the optical pick-up 22 when accessing the storage medium 21 for reducing coma aberration. In the optical system 20, an extra tilt corrector is required for correcting aberration, thereby increasing the manufacturing costs and complicating system operations.

A schematic diagram of a prior art optical pick-up 30 disclosed in U.S. Publication 2002/0067672 is shown in FIG. 3. The optical pick-up 30 includes light sources 10 and 12, an optical sensor 14, a conflux prism 31, a collimator lens 32, a grating 33, a polarized beam splitter (PBS) 34, a condenser lens 35, a liquid crystal layer 36, an object lens 37, and an actuator 38. The optical pick-up 30 reduces the aberration when accessing the storage medium 21 using the actuator 38 that includes a focus region and a tracking region. Based on signals measured by the optical sensor 14, the focus region of the actuator 38 adjusts the distance between the object lens 37 and the storage medium 21, and the tracking region of the actuator 38 adjusts the angle of the object lens 37. In the optical pick-up 30, an extra actuator is required for correcting aberration, thereby increasing the manufacturing costs and complicating system operations.

A schematic diagram of a prior art optical pick-up 40 disclosed in U.S. Publication 2004/0125711 is shown in FIG. 4. The optical pick-up 40 includes a light source 42, a spindle motor 43, a PBS 44, an optical sensor 45, a liquid crystal layer 46, a control circuit 47, lenses L1-L3, and indium tin oxide (ITO) electrodes $ITO_1$ and $ITO_2$. In the optical pick-up 40, the control circuit 47 sends correction voltages to the electrodes $ITO_1$ and $ITO_2$ based on signals measured by the optical sensor 45 in an open-loop manner. The aberration, which occurs when the optical pick-up 40 is accessing the storage medium 21, can thus be corrected. However, applying voltages to the electrodes $ITO_1$ and $ITO_2$ cannot improve aberration effectively, and different degrees of aberrations cannot be corrected flexibly.

To reduce coma aberration in the prior art optical systems, an additional control circuit (such as the tilt corrector 26 or the actuator 38) or two ITO electrodes are required for adjusting the angle of the lens. This makes the prior art optical systems more expensive and complicated. However, coma aberration cannot be corrected efficiently and flexibly.

SUMMARY OF THE INVENTION

The claimed invention provides a light-converging device capable of correcting aberration comprising a lens for converging light onto a storage medium for accessing data stored in the storage medium; a liquid crystal layer integrated with the lens and disposed in an optical path along which the light-converging device converges light onto the storage medium; and an electrode set electrode set for providing a variable electrical field across the liquid crystal layer.

The claimed invention also provides an optical reading apparatus capable of correcting aberration comprising: a light-emitting device for providing light; a lens for converging light provided by the light-emitting device onto a storage medium for accessing data stored in the storage medium; a liquid crystal layer disposed in an optical path between the light-emitting device and the storage medium; and an electrode set disposed in the optical path between the light-emitting device and the storage medium for changing an electrical field across the liquid crystal layer. The electrode set provides a variable electrical field across the liquid crystal layer.

These and other objectives of the present invention will no doubt become obvious to those of ordinary skill in the art after reading the following detailed description of the preferred embodiment that is illustrated in the various FIGS. and drawings.

BRIEF DESCRIPTION OF THE DRAWINGS

FIG. 1 shows a table listing specifications of common storage media.

DETAILED DESCRIPTION

The present invention corrects coma aberration by using a liquid crystal layer and generating a variable electrical field across the liquid crystal layer.

Figure 2:
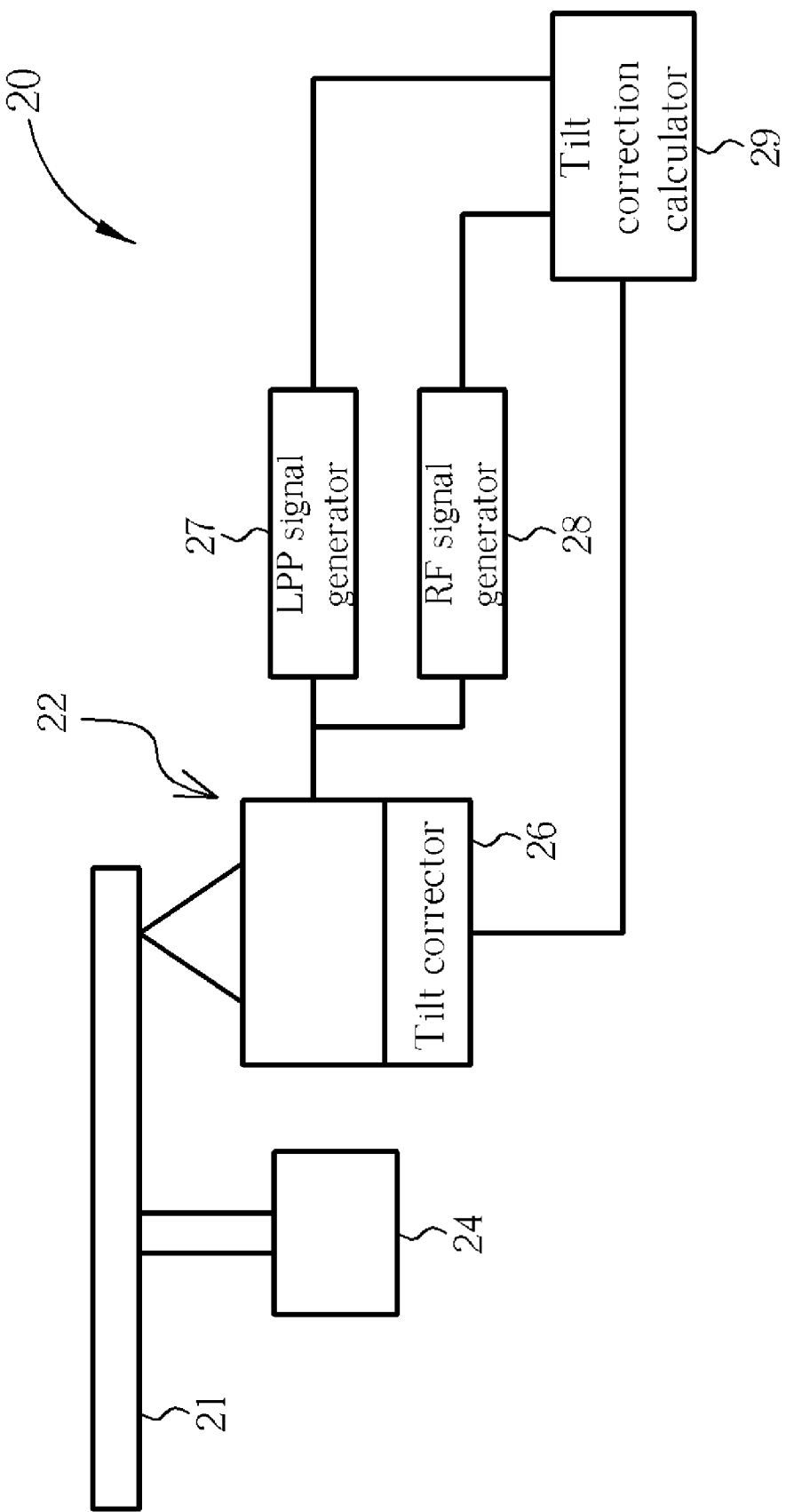
FIG. 2 shows a diagram of a prior art optical system.
Figure 3:
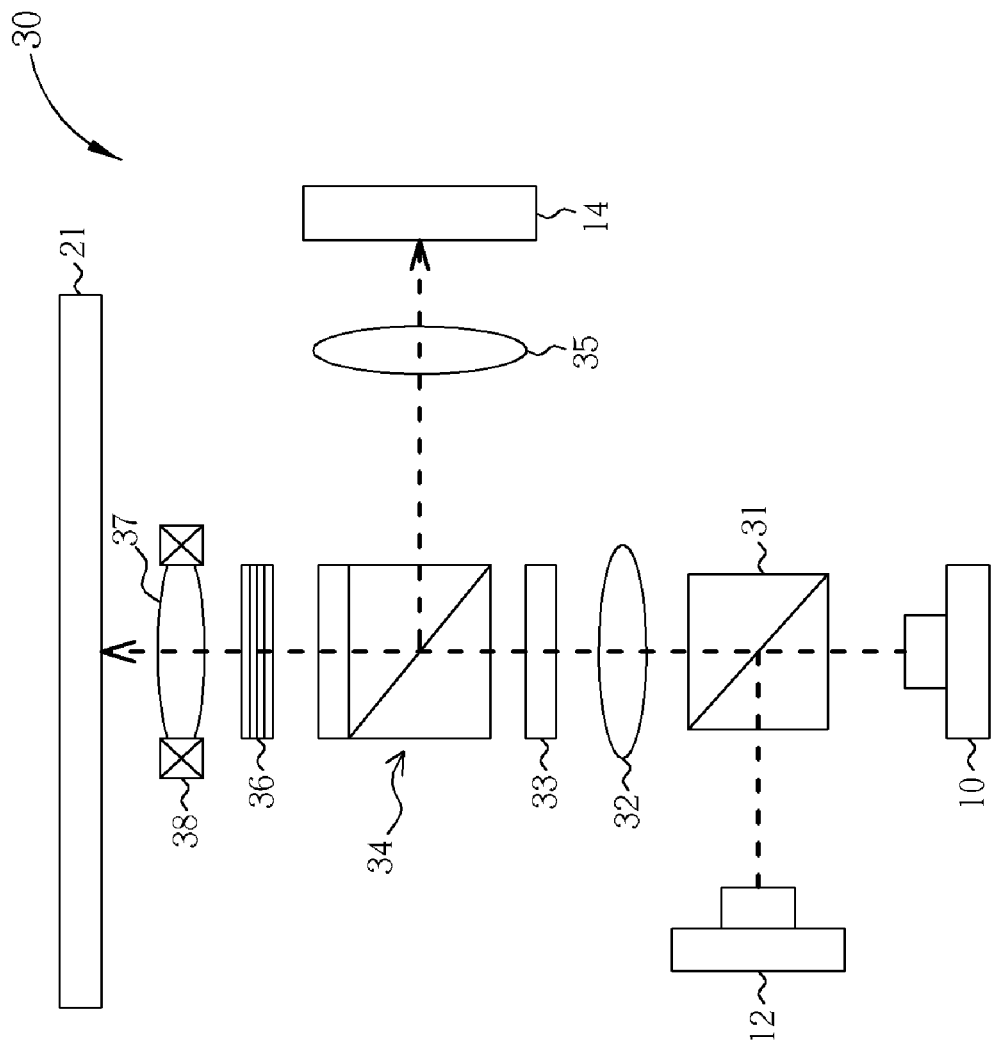
FIG. 3 shows a diagram of a prior art optical pick-up.
Figure 4:
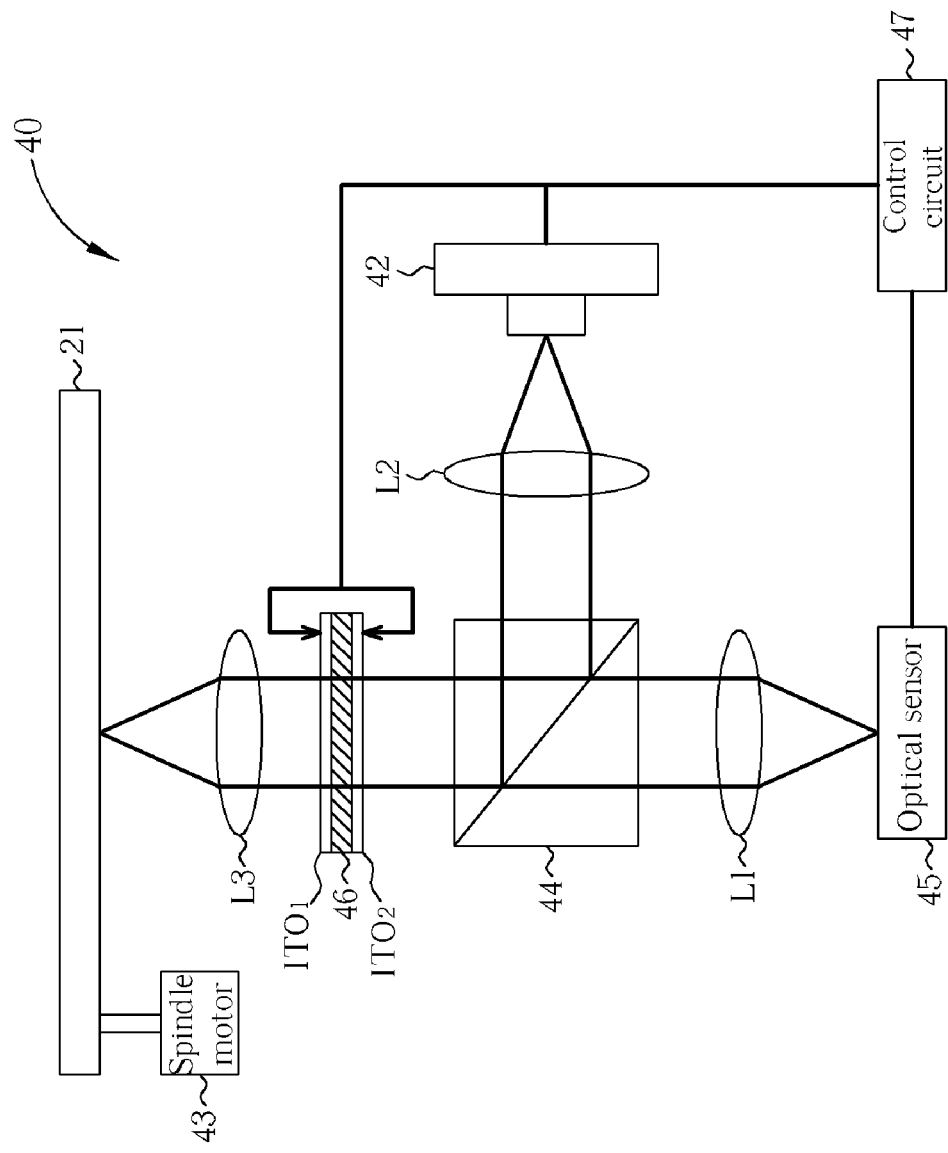
FIG. 4 shows a diagram of a prior art optical pick-up.
Figure 5:
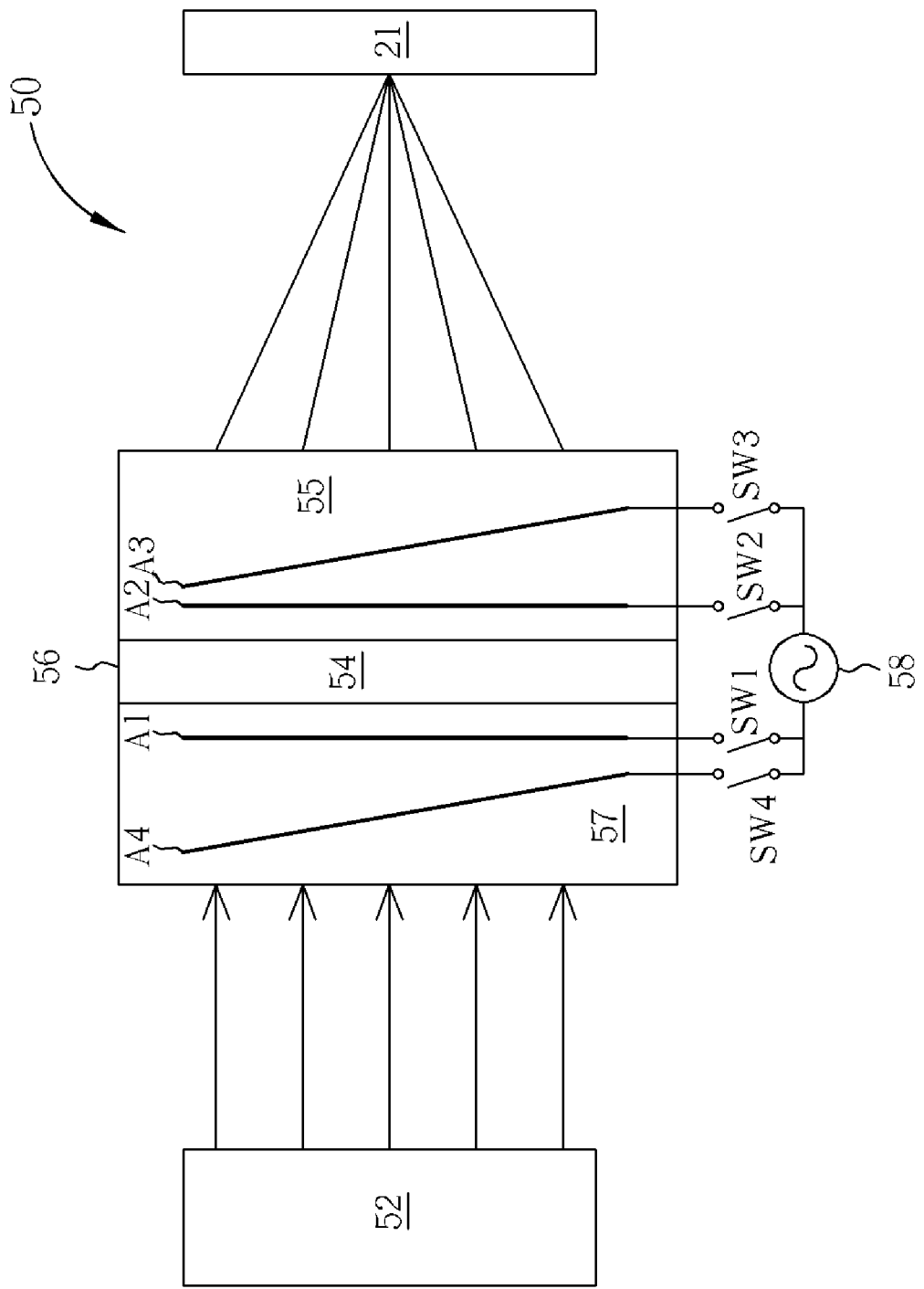
FIG. 5 shows a diagram of an optical system according to a first embodiment of the present invention.

A diagram of an optical system 50 according to a first embodiment of the present invention is shown in FIG. 5. The optical system 50 includes a light source 52, a liquid crystal layer 54, a lens 56, a power source 58, electrodes A1-A4, and switches SW1-SW4. The light source 52 can include a laser diode capable of providing light for accessing the storage medium 21. The lens 56 is disposed in an optical path between the light source 52 and the storage medium 21 for converging light emitted by the light source 52 onto the surface of the storage medium 21, thereby accessing data stored in the storage medium 21.

In the first embodiment of the present invention, the lens 56 can be made of plastic or glass and fabricated by using injection molding technology or by a founding process. The lens 56 includes an upper lens 55 and a bottom lens 57, between which the electrodes A1-A4 can be fabricated by using physical vapor deposition (PVD) or chemical vapor deposition (CVD) techniques. Subsequently, the liquid crystal layer 54 is formed, and the upper lens 55 and the bottom lens 57 of the lens 56 are sealed. As shown in FIG. 1, the electrodes A1-A4 are disposed at two sides of the liquid crystal layer 54. The electrodes A1 and A4 are disposed at a first side of the liquid crystal layer 54, wherein the electrode A1 is parallel to the first side of the liquid crystal layer 54 and the electrode A4 is not parallel to the first side of the liquid crystal layer 54. The electrodes A2 and A3 are disposed at a second side of the liquid crystal layer 54, wherein the electrode A2 is parallel to the second side of the liquid crystal layer 54 and the electrode A3 is not parallel to the second side of the liquid crystal layer 54. Therefore, the electrodes A1 and A2 are disposed at different sides of the liquid crystal layer 54 and parallel to each other, and the electrodes A3 and A4 are disposed at different sides of the liquid crystal layer 54 and parallel to each other. The power source 58 provides voltages to the electrodes disposed at the two sides of the liquid crystal layer 54 for changing the electrical field across the liquid crystal layer 54 in a direction along which light travels. In the first embodiment of the present invention, the power source 58 is electrically connected to the electrodes A1-A4 via the switches SW1-SW4, respectively.

Figure 6:
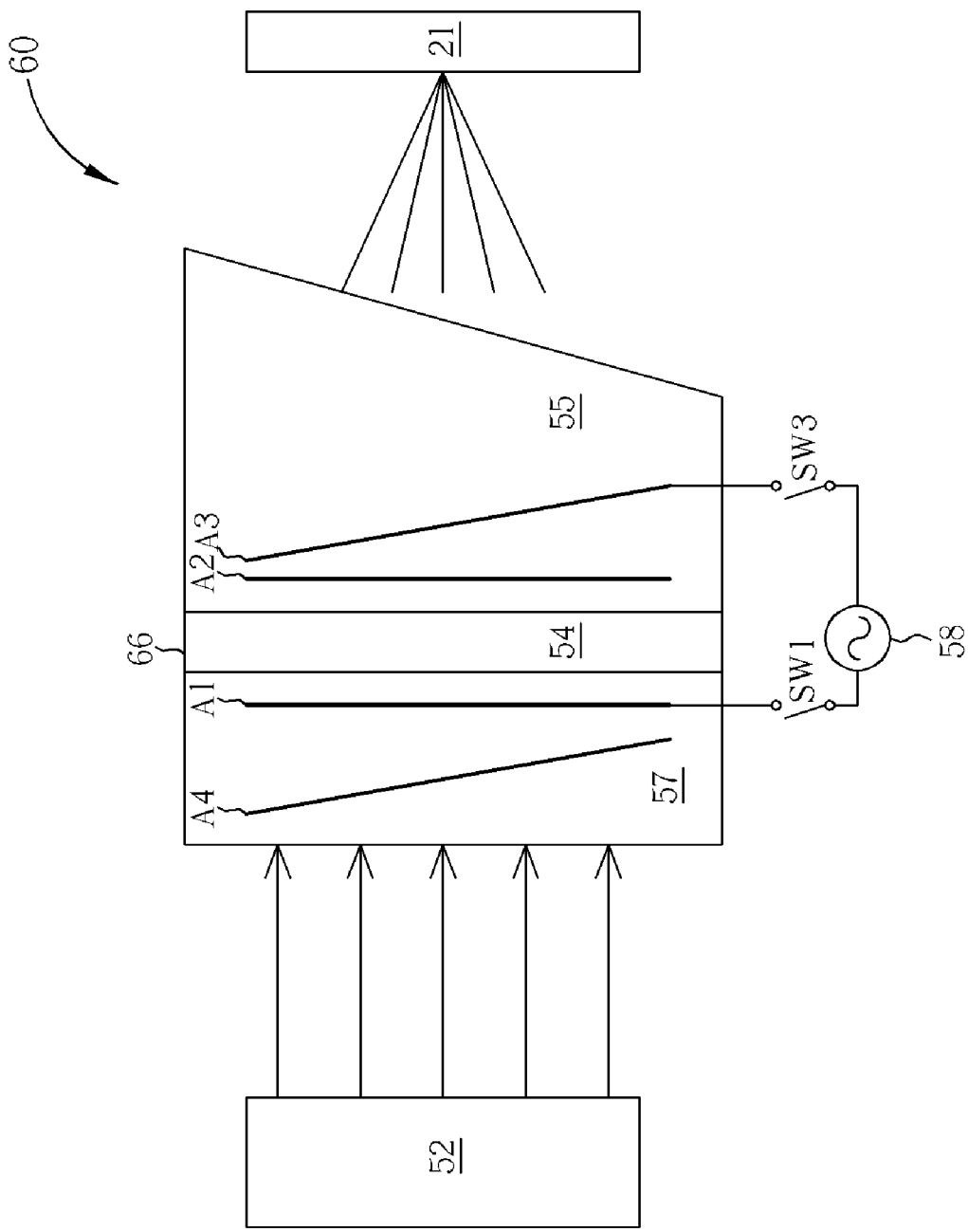
FIGS. 6 and 7 are diagrams of equivalent optical systems of the optical systems in FIG. 5.
Figure 7:
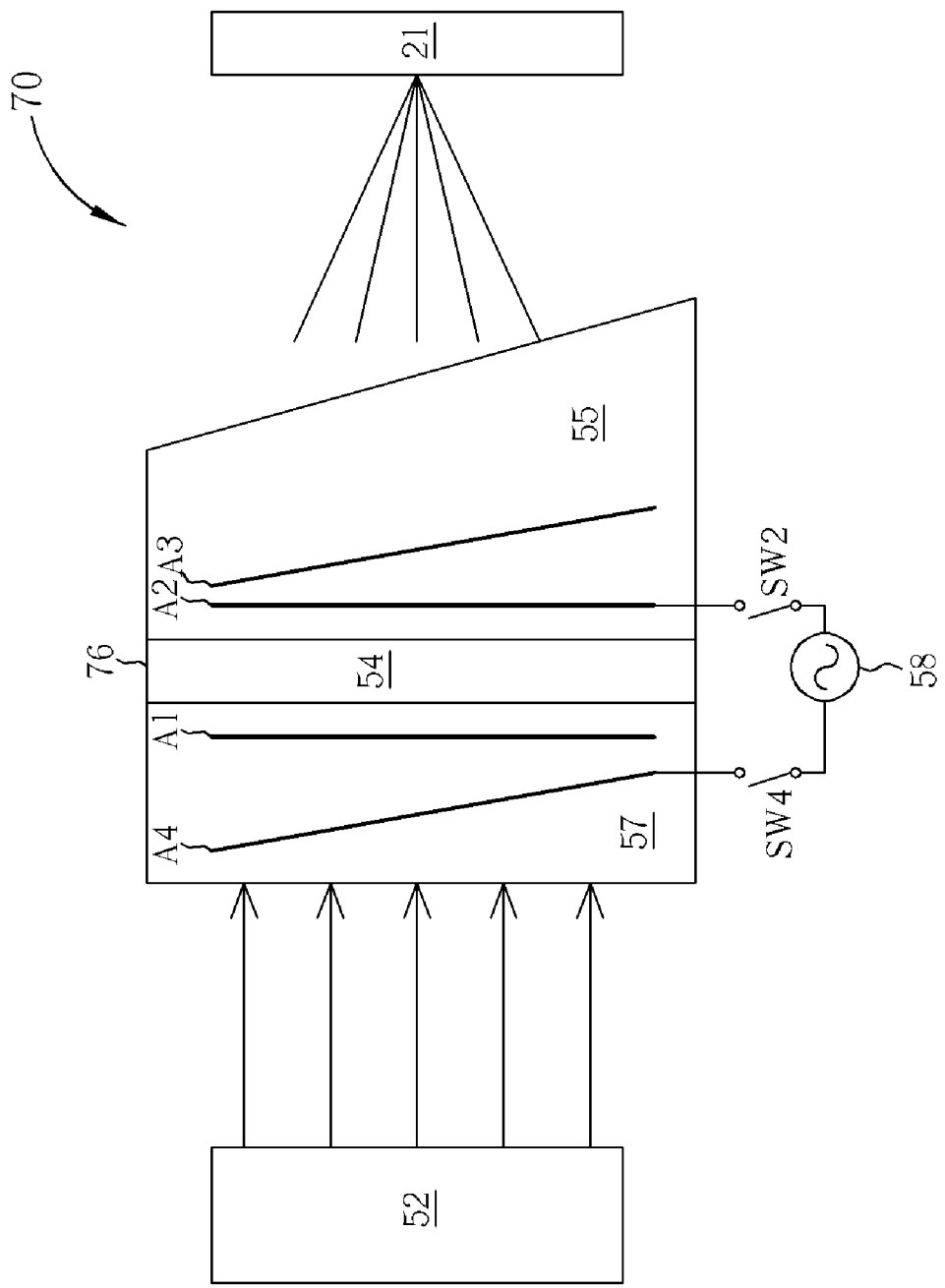

Since the refractive index of the liquid crystal layer 54 is related to the applied electrical field, which can be adjusted by applying voltages to the electrodes A1-A4 using the power source 58, coma aberration in the optical system 50 can be corrected. FIGS. 6 and 7 are diagrams of equivalent optical systems 60 and 70 of the optical system 50. In FIG. 6, the power source 58 is electrically connected to the electrodes A1 and A3 via the switches SW1 and SW3, respectively. Since the distance between the electrode A3 and the liquid crystal layer 54 varies, the electrodes A1 and A3 provide the liquid crystal layer 54 with a different electrical field in the direction of light propagation. Therefore, the light passes through the liquid crystal layer 54 at different locations of different refractive indexes. In the above-mentioned case, the lens of the optical system 50 functions as an equivalent lens 66 shown in FIG. 6. Similarly, in FIG. 7, the power source 58 is electrically connected to the electrodes A2 and A4 via the switches SW2 and SW4, respectively. Since the distance between the electrode A4 and the liquid crystal layer 54 varies, the electrodes A2 and A4 provide the liquid crystal layer 54 with a different electrical field in the direction of light propagation. Therefore, the light passes through the liquid crystal layer 54 at different locations of different refractive indexes. In this case, the lens of the optical system 50 functions as an equivalent lens 76 shown in FIG. 7. As shown in FIGS. 6 and 7, when the power source 58 supplies voltages to the electrodes, the lens of the optical system 50 functions as the equivalent lens 66 or 76, with which coma aberration due to the tilted storage medium 21 can be corrected by changing the direction of light propagation. Therefore, when the storage medium 21 is not properly displaced and has a large tilt angle, the optical system 50 of the present invention can determine the output voltage of the power source 58 and which electrodes should be electrically connected to the power source 58 based on the measured coma aberration. The refractive index of the liquid crystal layer 54 can thus be adjusted for correcting the coma aberration, thereby improving the accessing performance of the optical system 50.

Figure 8:
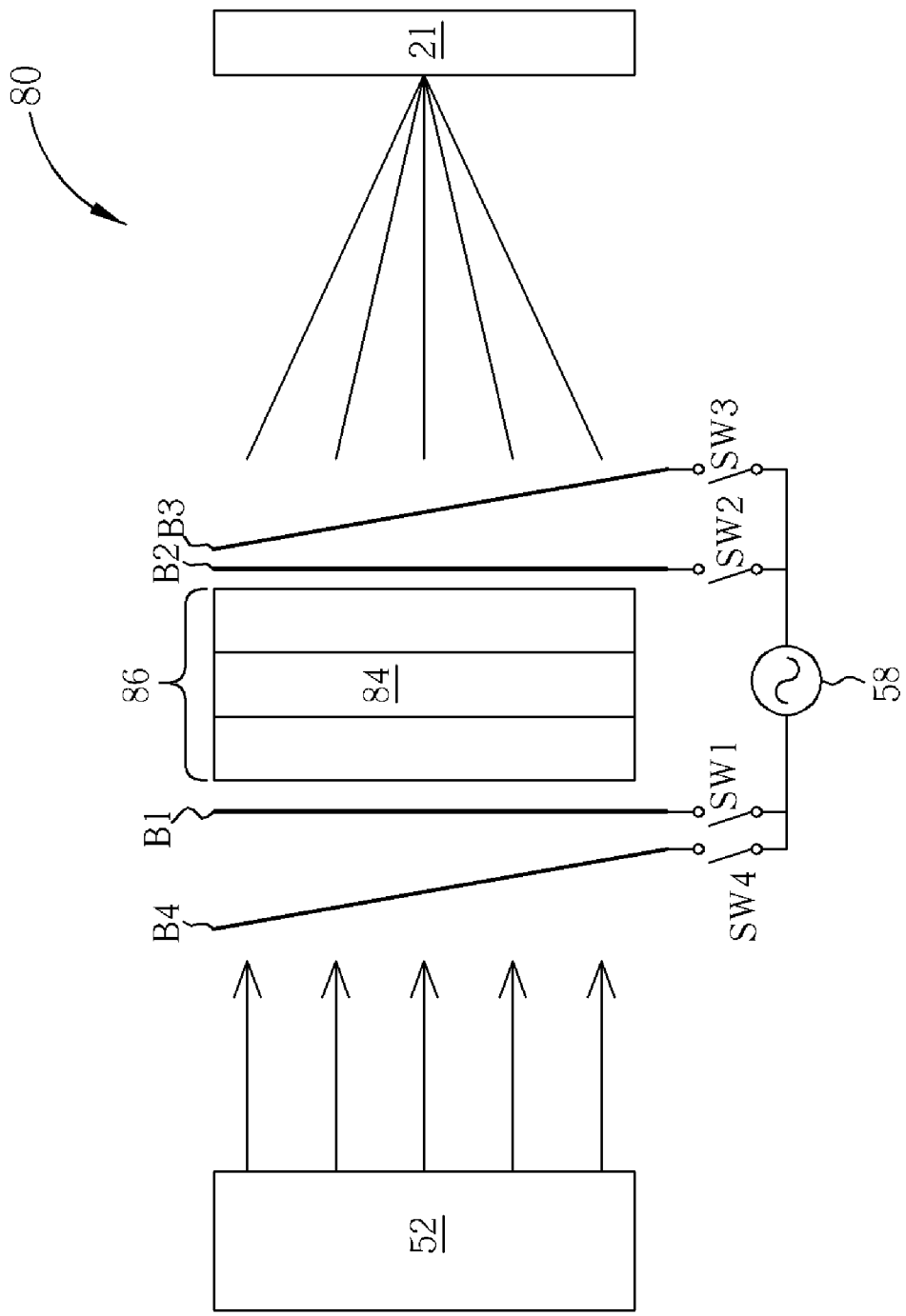
FIG. 8 shows a diagram of an optical system according to a second embodiment of the present invention.

A diagram of an optical system 80 according to a second embodiment of the present invention is shown in FIG. 8. The optical system 80 includes the light source 52, a liquid crystal layer 84, a lens 86, the power source 58, electrodes B1-B4, and the switches SW1-SW4. The optical system 80 differs from the optical system 50 in that the electrodes B1-B4 are disposed outside the lens 86. The electrodes B1-B4 are disposed at two sides of the liquid crystal layer 84. The electrodes B1 and B4 are disposed at a first side of the liquid crystal layer 84, wherein the electrode B1 is parallel to the first side of the liquid crystal layer 84 and the electrode B4 is not parallel to the first side of the liquid crystal layer 84. The electrodes B2 and B3 are disposed at a second side of the liquid crystal layer 84, wherein the electrode B1 is parallel to the second side of the liquid crystal layer 84 and the electrode B3 is not parallel to the second side of the liquid crystal layer 84. The electrodes B3 and B4 are parallel to each other. In other words, the parallel electrodes B1 and B2 are disposed at different sides of the liquid crystal layer 84 outside the lens 86 and, and the parallel electrodes B3 and B4 are disposed at different sides of the liquid crystal layer 84 outside the lens 86. Therefore, when the storage medium 21 is not properly displaced and has a large tilt angle, the optical system 80 of the present invention can also determine the output voltage of the power source 58 and which electrodes should be electrically connected to the power source 58 based on the measured coma aberration. The refractive index of the liquid crystal layer 84 can thus be adjusted for compensating the coma aberration, thereby improving the accessing performance of the optical system 80.

Figure 9:
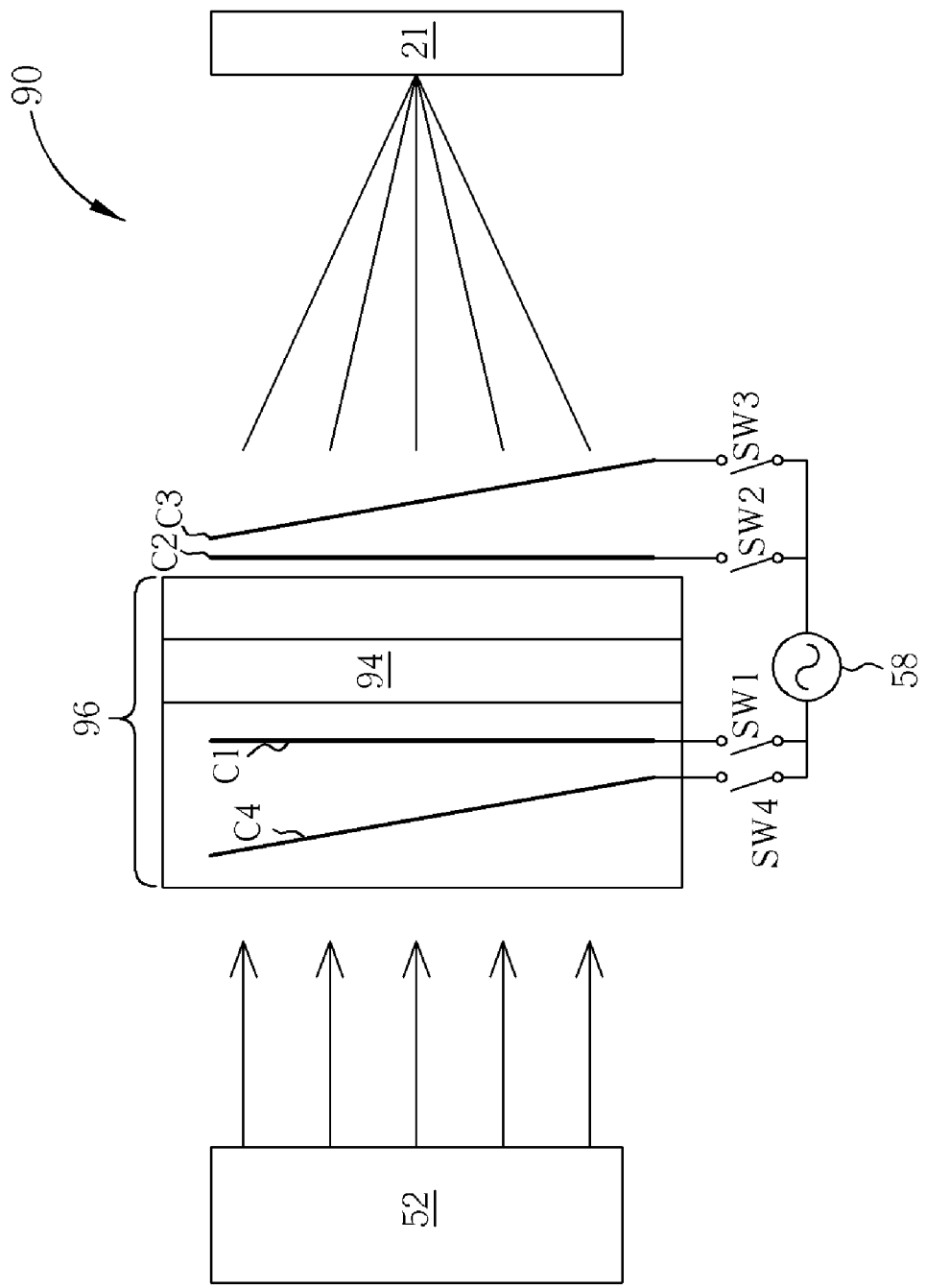
FIG. 9 shows a diagram of an optical system according to a third embodiment of the present invention.

A diagram of an optical system 90 according to a third embodiment of the present invention is shown in FIG. 9. The optical system 90 includes the light source 52, a liquid crystal layer 94, a lens 96, the power source 58, electrodes C1-C4, and the switches SW1-SW4. The optical system 90 differs from the optical system 50 in that the electrodes C2 and C3 are disposed outside the lens 96, while the electrodes C1 and C4 are disposed inside the lens 96. The electrodes C1-C4 are disposed at two sides of the liquid crystal layer 94. The electrodes C1 and C4 are disposed at a first side of the liquid crystal layer 94 inside the lens 96, wherein the electrode C1 is parallel to the first side of the liquid crystal layer 94 and the electrode C4 is not parallel to the first side of the liquid crystal layer 94. The electrodes C2 and C3 are disposed at a second side of the liquid crystal layer 94 outside the lens 96, wherein the electrode C2 is parallel to the second side of the liquid crystal layer 94 and the electrode C3 is not parallel to the second side of the liquid crystal layer 94. The electrodes C3 and C4 are parallel to each other. Therefore, when the storage medium 21 is not properly displaced and has a large tilt angle, the optical system 90 of the present invention can also determine the output voltage of the power source 58 and which electrodes should be electrically connected to the power source 58 based on the measured coma aberration. The refractive index of the liquid crystal layer 94 can thus be adjusted for compensating the coma aberration, thereby improving the accessing performance of the optical system 90.

Figure 10:
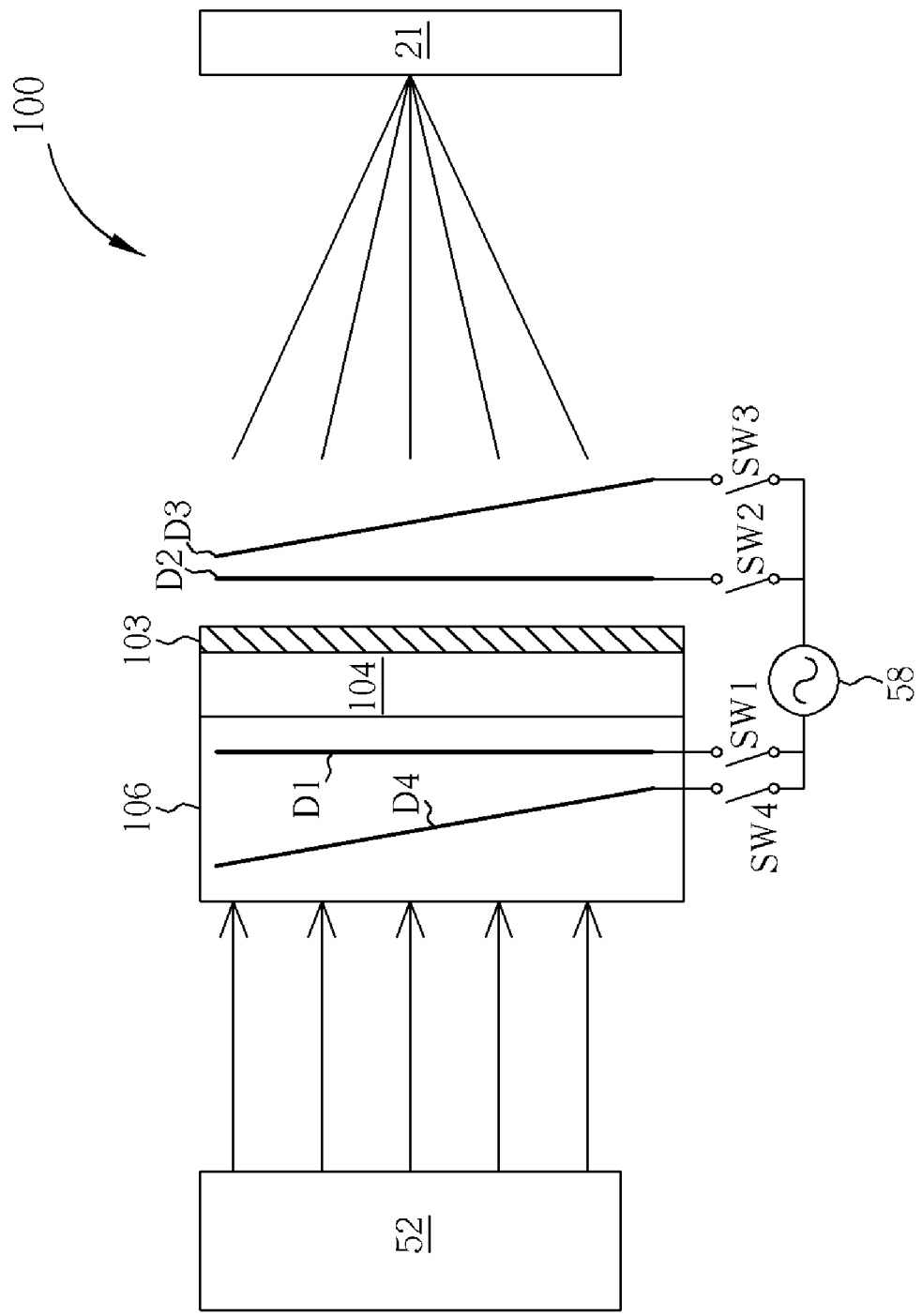
FIG. 10 shows a diagram of an optical system according to a fourth embodiment of the present invention.

A diagram of an optical system 100 according to a fourth embodiment of the present invention is shown in FIG. 10. The optical system 100 includes the light source 52, a liquid crystal layer 104, a lens 106, a protecting layer 103, the power source 58, electrodes D1-D4, and the switches SW1-SW4. The optical system 100 differs from the optical system 50 in that the liquid crystal layer 104 and two electrodes are disposed outside the lens 106, and the optical system 100 further includes the protecting layer 103. In the optical system 100, the electrodes D1 and D4 are disposed at a first side of the liquid crystal layer 104 inside the lens 106, wherein the electrode D1 is parallel to the first side of the liquid crystal layer 104 and the electrode D4 is not parallel to the first side of the liquid crystal layer 104. The electrodes D2 and D3 are disposed at a second side of the liquid crystal layer 104 outside the lens 106, wherein the electrode D2 is parallel to the second side of the liquid crystal layer 104 and the electrode D3 is not parallel to the second side of the liquid crystal layer 104. The electrodes D3 and D4 are parallel to each other. Therefore, when the storage medium 21 is not properly displaced and has a large tilt angle, the optical system 100 of the present invention can also determine the output voltage of the power source 58 and which electrodes should be electrically connected to the power source 58 based on the measured coma aberration. The refractive index of the liquid crystal layer 104 can thus be adjusted for compensating the coma aberration, thereby improving the accessing performance of the optical system 100.

Figure 11:
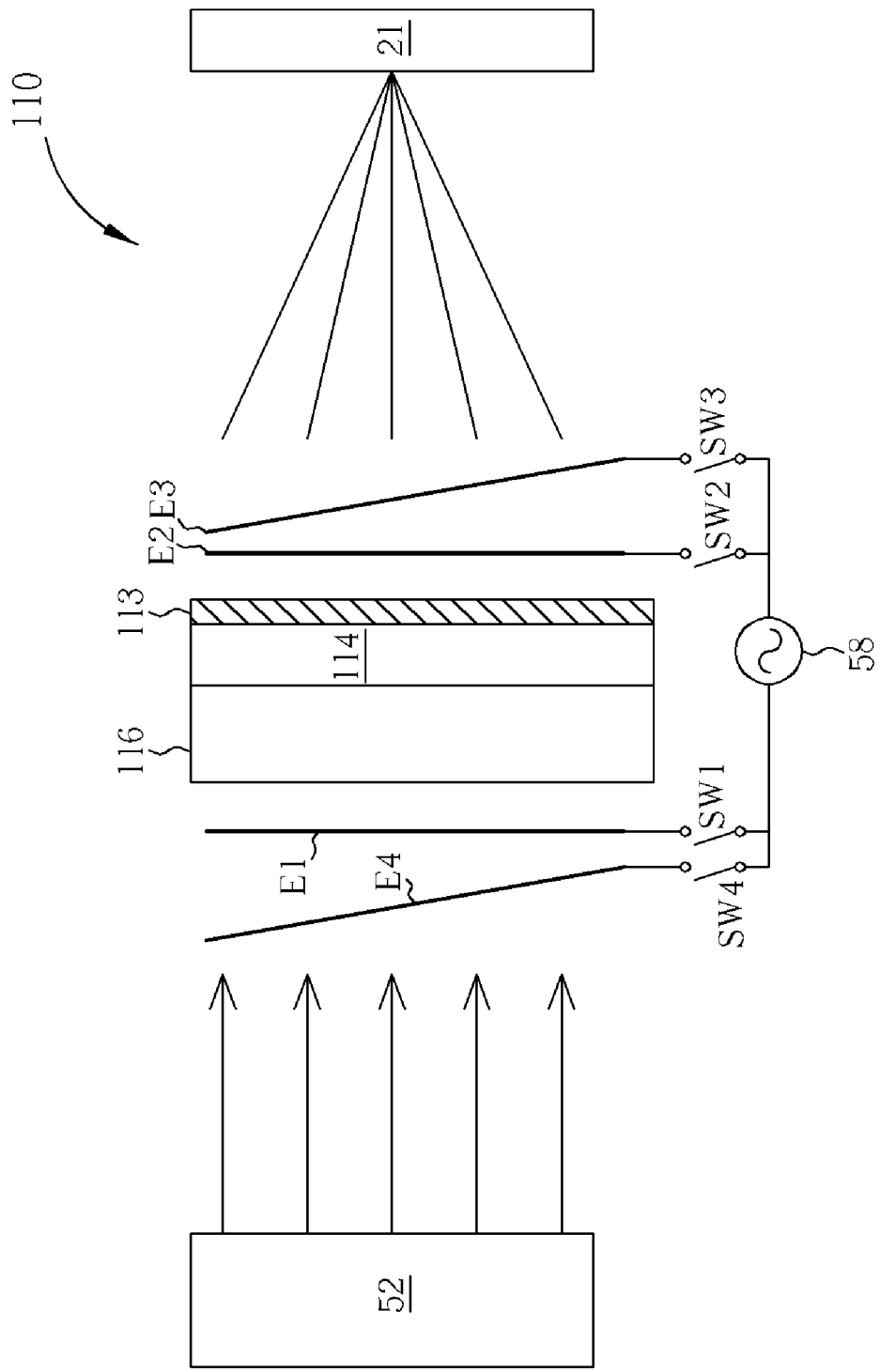
FIG. 11 shows a diagram of an optical system according to a fifth embodiment of the present invention.

A diagram of an optical system 110 according to a fifth embodiment of the present invention is shown in FIG. 11. The optical system 110 includes the light source 52, a liquid crystal layer 114, a lens 116, a protecting layer 113, the power source 58, electrodes E1-E4, and the switches SW1-SW4. The optical system 110 differs from the optical system 50 in that the liquid crystal layer 114 and the electrodes E1-E4 are disposed outside the lens 116, and the optical system 110 further includes the protecting layer 113. In the optical system 110, the electrodes E1 and E4 are disposed at a first side of the liquid crystal layer 114 outside the lens 116, wherein the electrode E1 is parallel to the first side of the liquid crystal layer 114 and the electrode E4 is not parallel to the first side of the liquid crystal layer 114. The electrodes E2 and E3 are disposed at a second side of the liquid crystal layer 114 outside the lens 116, wherein the electrode E2 is parallel to the second side of the liquid crystal layer 114 and the electrode E3 is not parallel to the second side of the liquid crystal layer 114. The electrodes E3 and E4 are parallel to each other. Therefore, when the storage medium 21 is not properly displaced and has a large tilt angle, the optical system 110 of the present invention can also determine the output voltage of the power source 58 and which electrodes should be electrically connected to the power source 58 based on the measured coma aberration. The refractive index of the liquid crystal layer 114 can thus be adjusted for compensating the coma aberration, thereby improving the accessing performance of the optical system 110.

The electrodes used in the optical systems 50, 80-110 can include indium tin oxide (ITO). ITO is transparent material and does not greatly influence light propagation. The optical systems 50, 80-110 can include conventional CD drives, DVD drives, BD drives or HD-DVD drives. The power source 58 can be electrically connected to corresponding electrodes via the switches SW1-SW4 or by using other methods. Based on different optical systems, the electrodes can be disposed at different angles with respect to the liquid crystal layer for providing flexible aberration adjustments.

Figure 12:
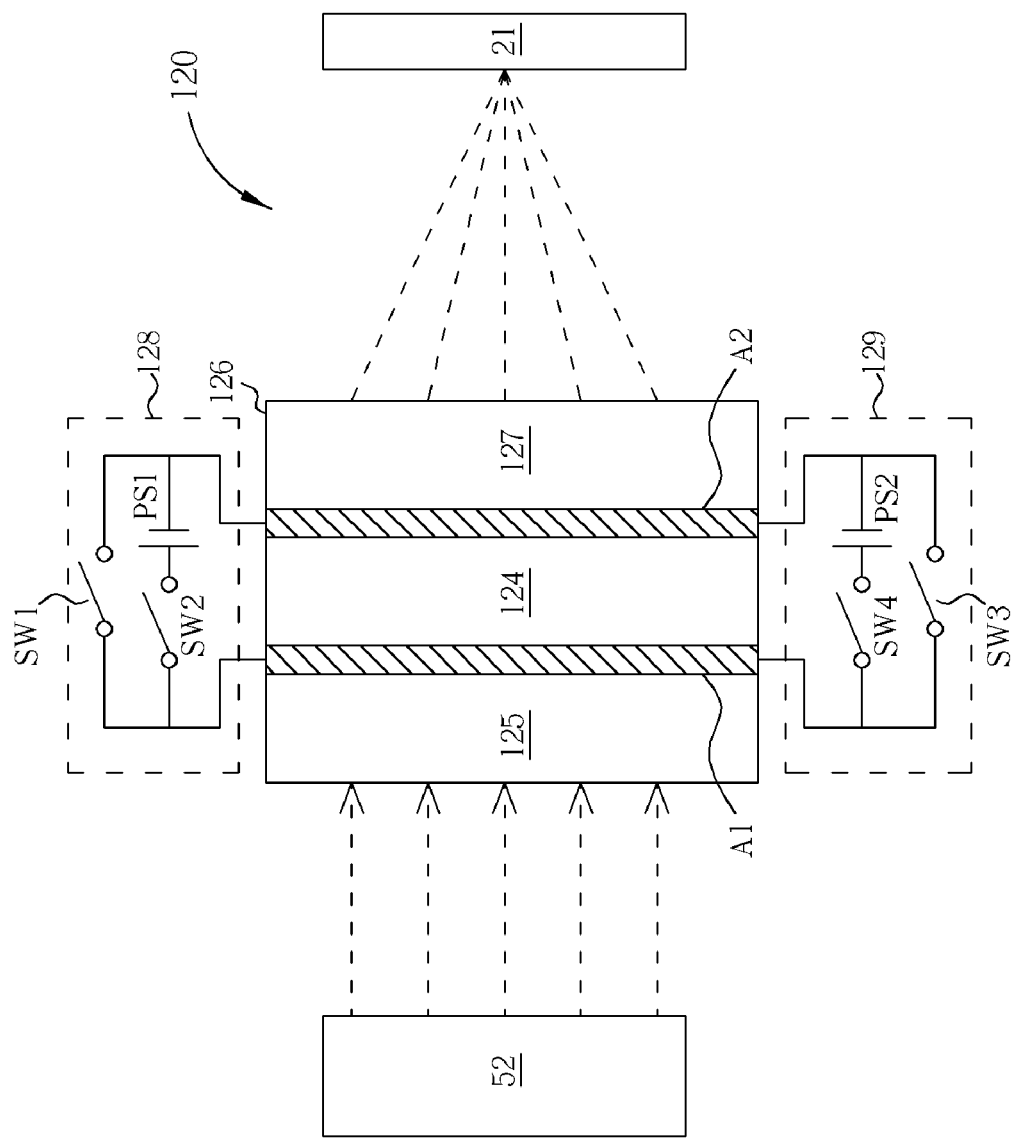
FIG. 12 shows a diagram of an optical system according to a sixth embodiment of the present invention.

A diagram of an optical system 120 according to a sixth embodiment of the present invention is shown in FIG. 12. The optical system 120 includes a light source 52, a liquid crystal layer 124, a lens 126, electrodes A1 and A2, and power supply units 128 and 129. The light source 52 can include a laser diode capable of providing light for accessing the storage medium 21. The lens 126 is disposed in an optical path between the light source 52 and the storage medium 21 for converging light emitted by the light source 52 onto the surface of the storage medium 21, thereby accessing data stored in the storage medium 21. The liquid crystal layer 124 is formed inside the lens 126 for providing incident light with different refractive indexes according to different applied electrical fields. The electrodes A1 and A2 have different sheet resistance and are disposed at two sides of the liquid crystal layer 124, respectively. The power supply unit 128 is coupled to first ends of the electrodes A1 and A2 and includes a power source PS1 and switches SW1-SW2. The power supply unit 129 is coupled to second ends of the electrodes A1 and A2 and includes a power source PS2 and switches SW3-SW4. The power supply units 128 and 129 provide voltages to the electrodes A1 and A2 for changing an electrical field established across the liquid crystal layer 124 in a direction along which light travels.

In the sixth embodiment of the present invention, the lens 126 can be made of plastic or glass and can be fabricated by using injection molding technology or by a founding process. The lens 126 includes an upper lens 125 and a bottom lens 127, between which the electrodes A1 and A2 can be fabricated by using physical vapor deposition or chemical vapor deposition techniques. Subsequently, the liquid crystal layer 124 is formed, and the upper lens 125 and the bottom lens 127 of the lens 126 are sealed.

Since the refractive index of the liquid crystal layer 124 is related to the applied electrical field, which can be adjusted by applying voltages to the electrodes A1 and A2 using the power supply units 128 and 129, coma aberration in the optical system 120 can be compensated. An electrical field E established across the liquid crystal layer 124 can be represented by the following formula:

$$E = V/d$$

where V represents the voltage difference across the two sides of the liquid crystal layer 124, and d represents the distance between the electrodes A1 and A2.

Figure 13:
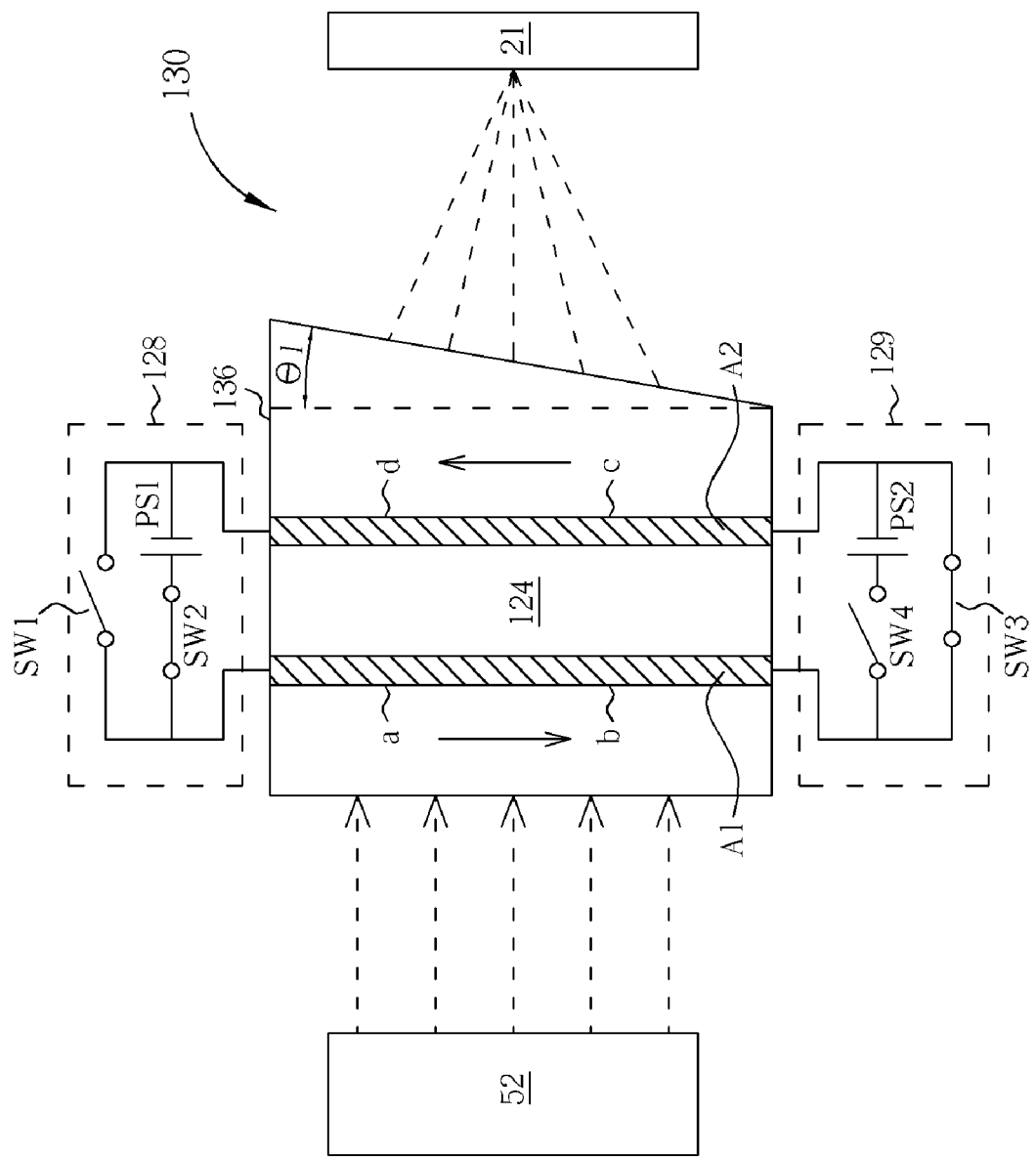
FIG. 13 shows an equivalent optical system of the optical systems in FIG. 12 when operating in a first mode.

When the optical system 120 is operating in a first mode, a diagram of an equivalent optical system 130 is shown in FIG. 13. In FIG. 13, the switches SW1 and SW4 are turned off (open-circuited), and the switches SW2 and SW3 are turned on (short-circuited). Therefore, the power source PS1 is electrically connected to the first ends of the electrodes A1 and A2, and the power source PS2 is electrically isolated from the second ends of the electrodes A1 and A2. When the optical system 120 is operating in the first mode, the current supplied by the power source PS1 flows from the first end of the electrode A1 to the first end of the electrode A2 via the second ends of the electrodes A1 and A2, in a sequence a-b-c-d as designated in FIG. 13. The current direction during the first mode is indicated by solid arrows in FIG. 13.

Figure 14:
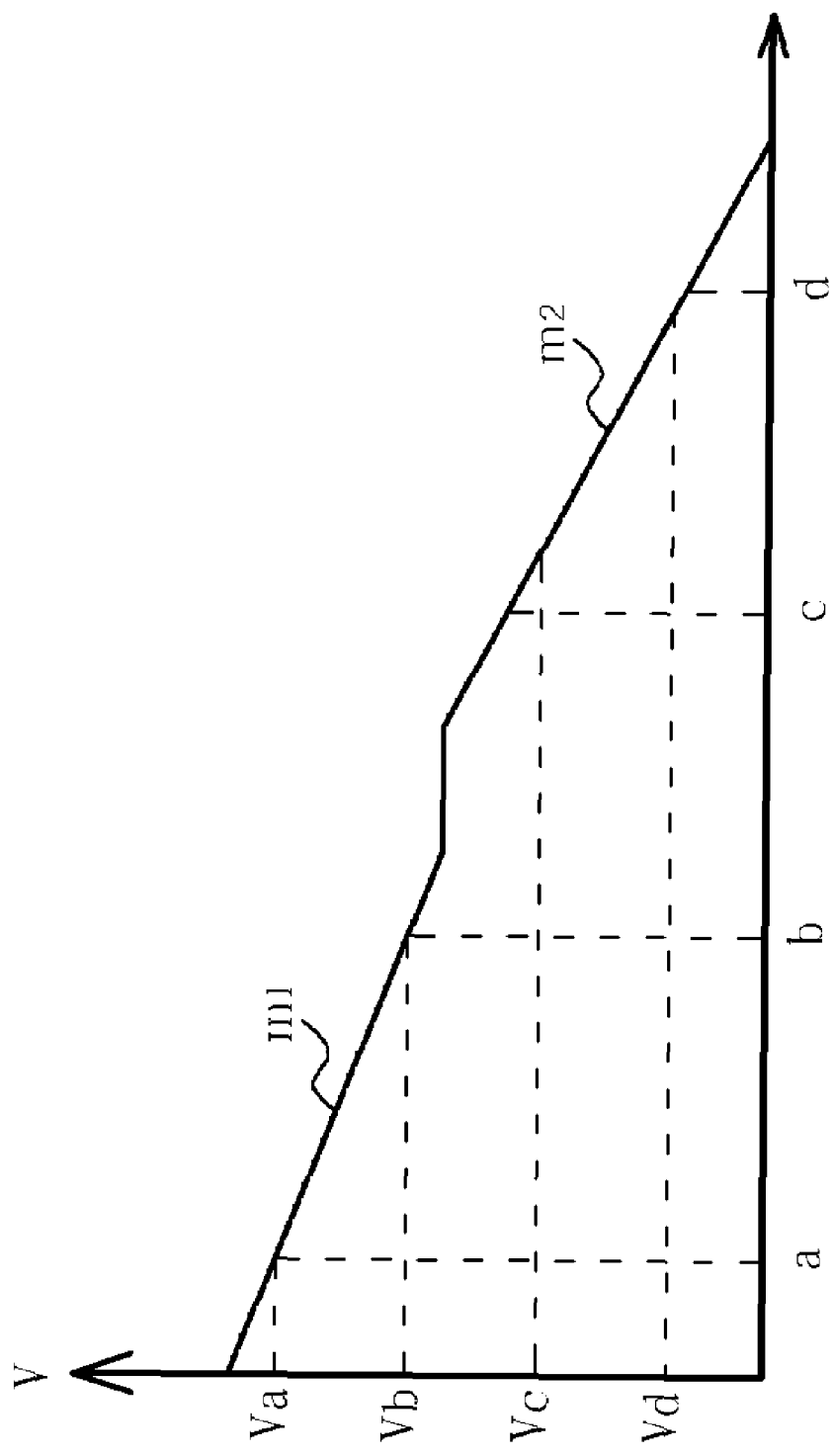
FIG. 14 shows a diagram of the electrode voltage levels of the optical systems in FIG. 12 when operating in the first mode.

When the optical system 120 is operating in the first mode, a diagram showing the voltage level of the electrodes A1 and A2 is shown in FIG. 14. In FIG. 14, the electrode voltages obtained at the designated points a-d are represented by Va-Vd, respectively. The slopes representing the voltage variations of the electrodes A1 and A2 are designated as m1 and m2, respectively. Due to different travel distance of the current, the voltages obtained at the points a-d of the electrodes A1 and A2 have the following relationship: Va>Vb>Vc>Vd. Also, since the electrodes A1 and A2 are parallel to each other and the distance between the electrodes is constant, the electrical field established across the liquid crystal layer 124 is related to the voltage difference between the electrodes A1 and A2. At this time, the lens of the optical system 120 functions as an equivalent lens 136 shown in FIG. 13. The equivalent lens 136, similar to a lens with a chamfer angle φ1, can change the refracting angle of the incident light for correcting coma aberration due to large tilt angle of the storage medium 21.

Figure 15:
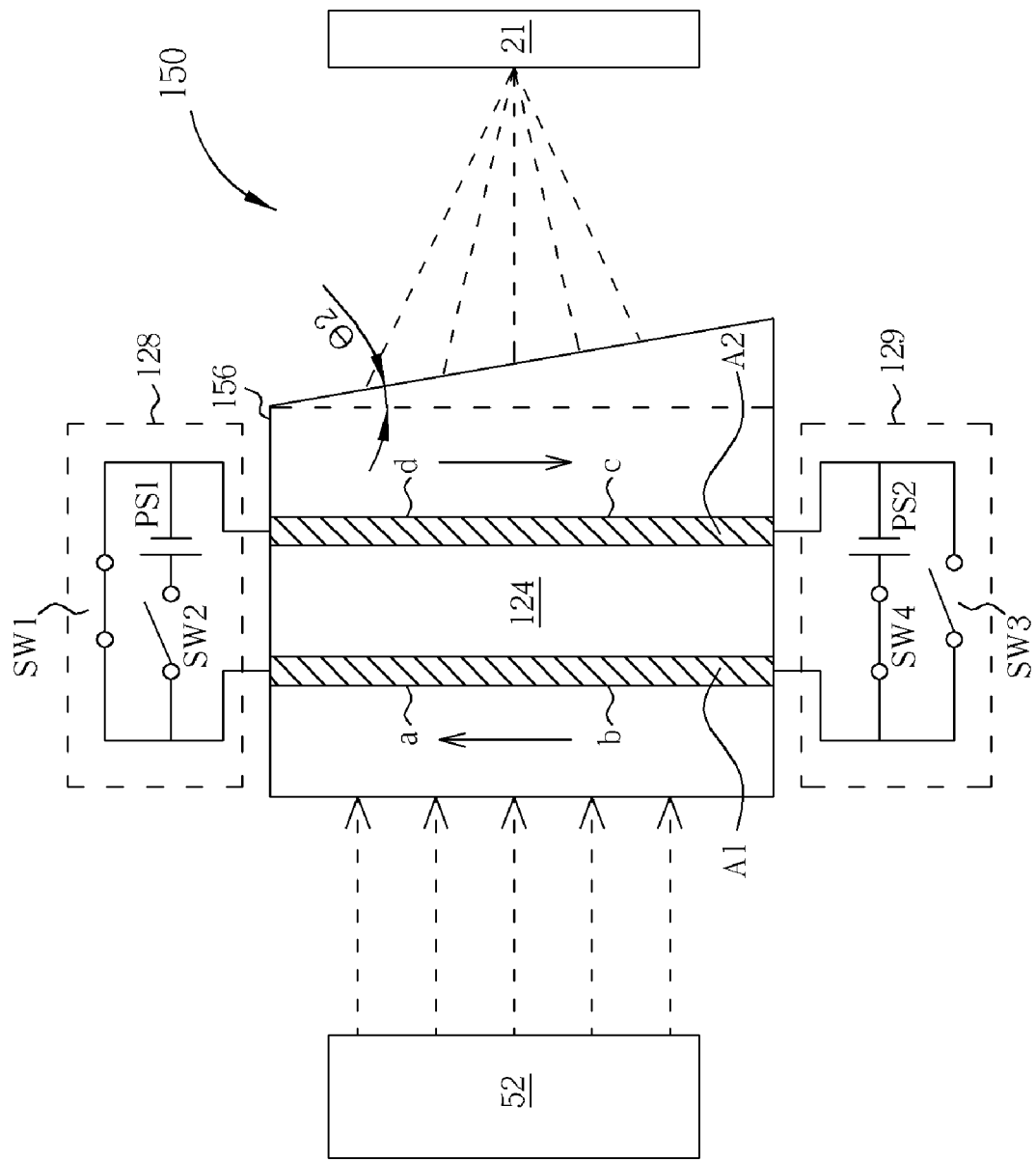
FIG. 15 shows an equivalent optical system of the optical systems in FIG. 12 when operating in a second mode.

When the optical system 120 is operating in a second mode, a diagram of an equivalent optical system 150 is shown in FIG. 15. In FIG. 15, the switches SW1 and SW4 are turned on, and the switches SW2 and SW3 are turned off. Therefore, the power source PS1 is electrically isolated from the first ends of the electrodes A1 and A2, and the power source PS2 is electrically connected to the second ends of the electrodes A1 and A2. When the optical system 120 is operating in the second mode, the current supplied by the power source PS2 flows from the second end of the electrode A1 to the second end of the electrode A2 via the first ends of the electrodes A1 and A2, in a sequence b-a-d-c as designated in FIG. 15. The current direction during the second mode is indicated by solid arrows in FIG. 15.

Figure 16:
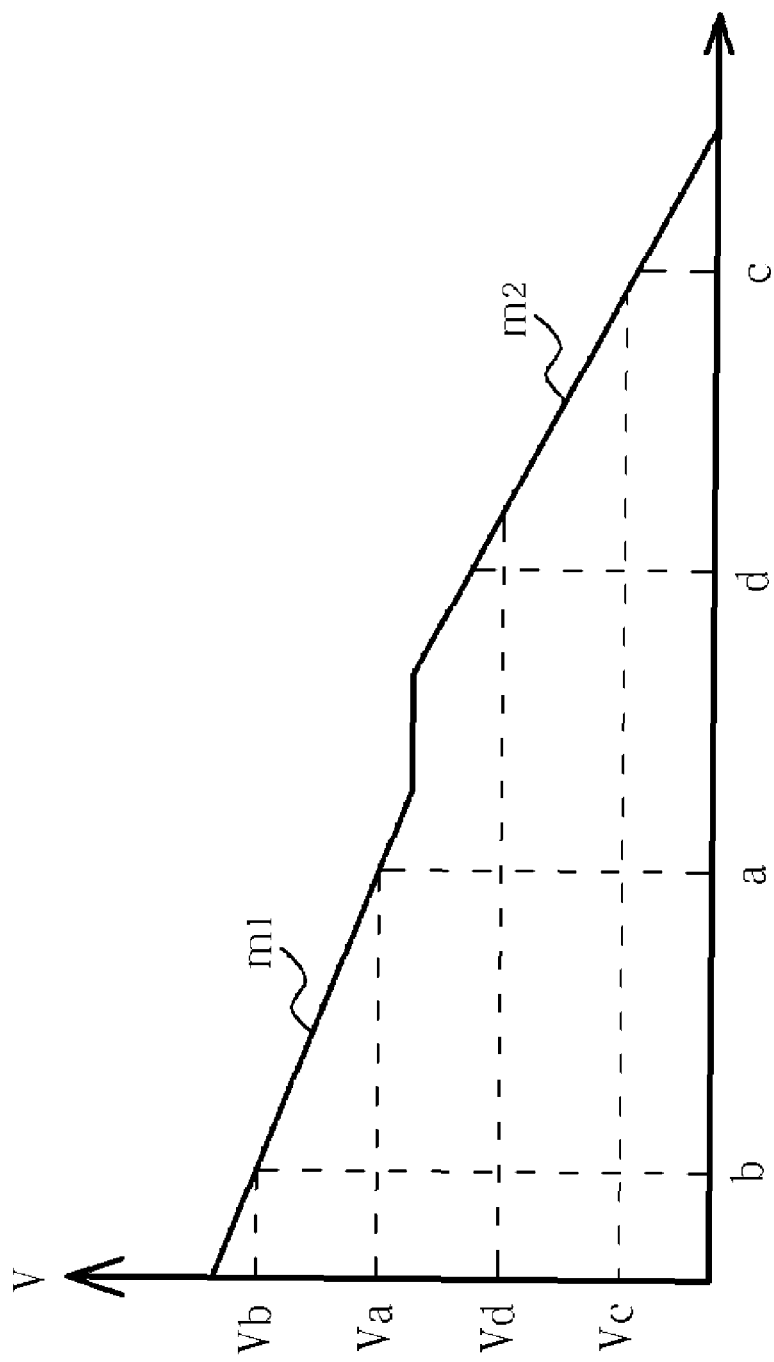
FIG. 16 shows a diagram of the electrode voltage levels of the optical systems in FIG. 12 when operating in the second mode.

When the optical system 120 is operating in the second mode, a diagram showing the voltage level of the electrodes A1 and A2 is shown in FIG. 16. In FIG. 16, the electrode voltages obtained at the designated points a-d are represented by Va-Vd, respectively. The slopes representing the voltage variations of the electrodes A1 and A2 are designated as m1 and m2, respectively. Due to different travel distance of the current, the voltages obtained at the points a-d of the electrodes A1 and A2 have the following relationship: Vb>Va>Vd>Vc. Also, since the electrodes A1 and A2 are parallel to each other and the distance between the electrodes is constant, the electrical field established across the liquid crystal layer 124 is related to the voltage difference between the electrodes A1 and A2. At this time, the lens of the optical system 120 functions as an equivalent lens 156 shown in FIG. 15. The equivalent lens 156, similar to a lens with a chamfer angle φ2, can change the refracting angle of the incident light for correcting coma aberration due to large tilt angle of the storage medium 21.

The electrodes A1 and A2 of the optical system 120 have different sheet resistance, resulting in different slopes m1 and m2. The chamfer angles φ1 and φ2 can be adjusted by changing the sheet resistance of the electrodes A1 and A2. Therefore, when the storage medium 21 is not properly displaced and has a large tilt angle, the voltages of the power source PS1 and PS2 can be determined and the switches SW1-SW4 can be turned on or turned off based on the measured coma aberration. The refractive index of the liquid crystal layer 124 can thus be adjusted for compensating different degrees of coma aberration, thereby improving the accessing performance of the optical system 50.

Figure 17:
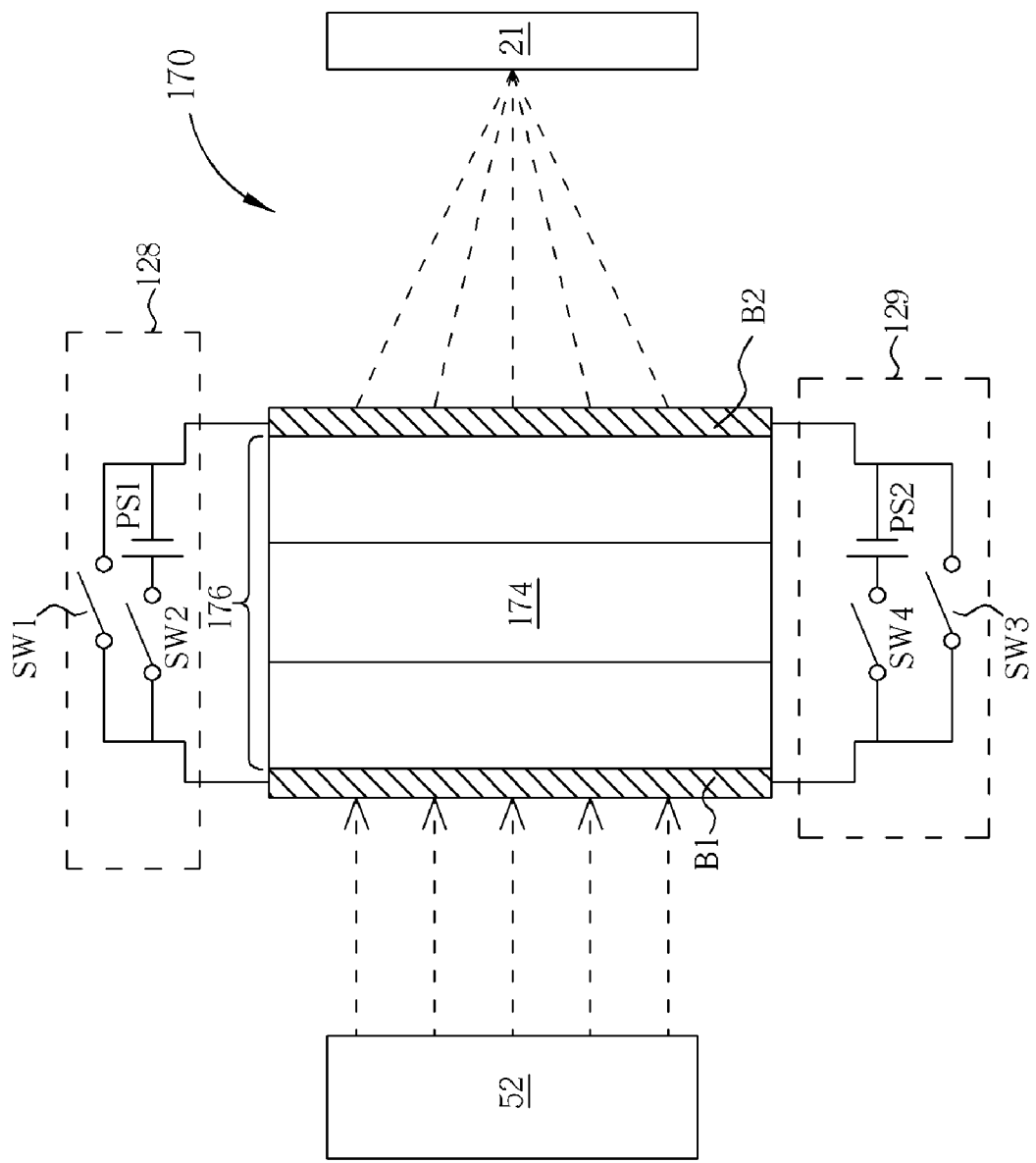
FIG. 17 shows a diagram of an optical system according to a seventh embodiment of the present invention.

A diagram of an optical system 170 according to a seventh embodiment of the present invention is shown in FIG. 17. The optical system 170 includes the light source 52, a liquid crystal layer 174, a lens 176, electrodes B1 and B2, and the power supply units 128 and 129. The optical system 100 differs from the optical system 120 in that the electrodes B1 and B2 are disposed outside the lens 176. The electrodes B1 and B2 also have different sheet resistance. In the seventh embodiment of the present invention, the lens 176 can be made of plastic or glass and can be fabricated by using injection molding technology or by a founding process. The electrodes B1 and B2 can be fabricated outside the lens 176 using physical vapor deposition or chemical vapor deposition techniques. Therefore, when the storage medium 21 is not properly displaced and has a large tilt angle, the voltages of the power source PS1 and PS2 can be determined and the switches SW1-SW4 can be turned on or turned off based on the measured coma aberration. The refractive index of the liquid crystal layer 174 can thus be adjusted for compesating different degrees of coma aberration, thereby improving the accessing performance of the optical system 170.

Figure 18:
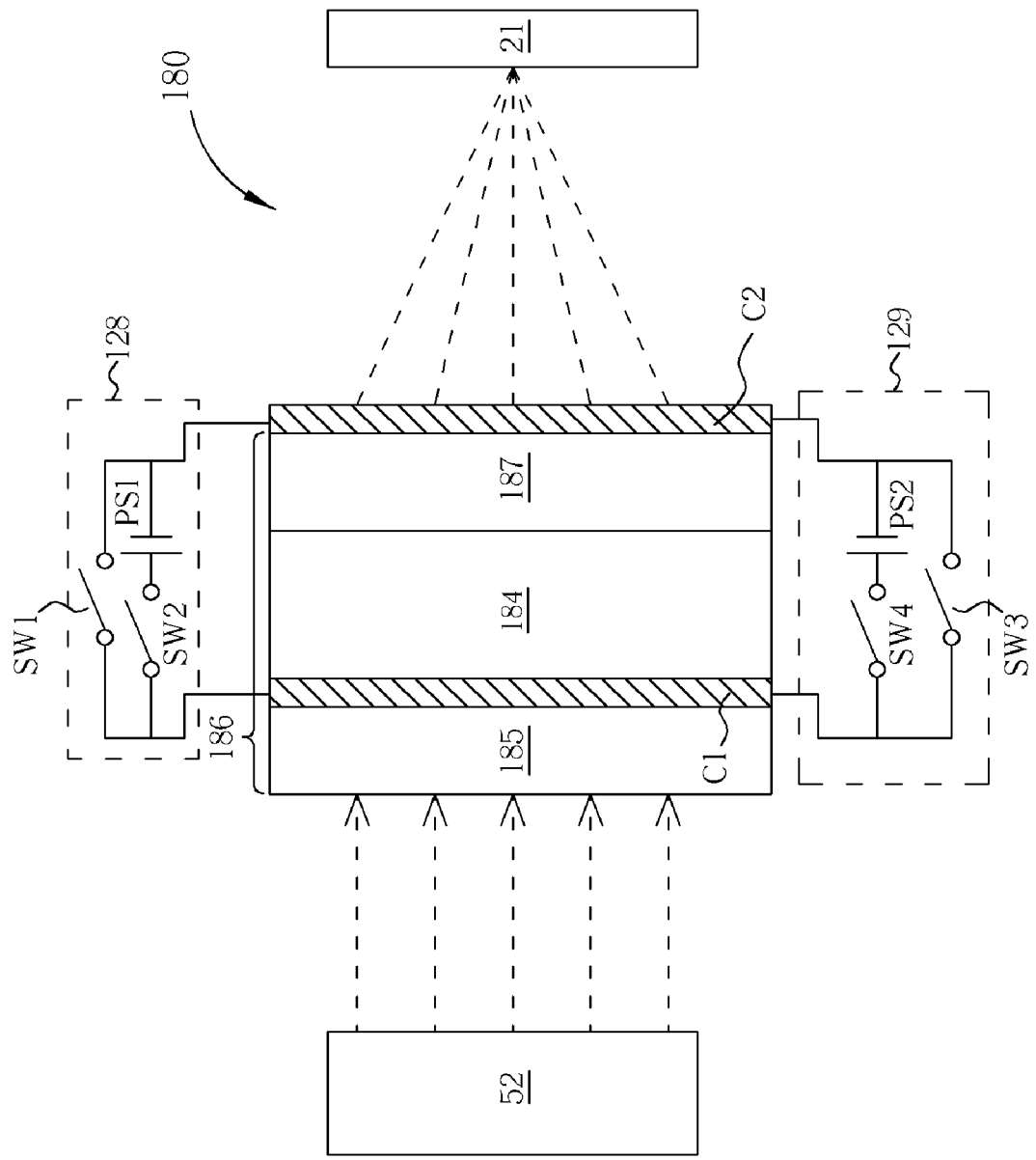
FIG. 18 shows a diagram of an optical system according to a eighth embodiment of the present invention.

A diagram of an optical system 180 according to an eighth embodiment of the present invention is shown in FIG. 18. The optical system 180 includes the light source 52, a liquid crystal layer 184, a lens 186, electrodes C1 and C2, and the power supply units 128 and 129. The optical system 180 differs from the optical system 120 in that the electrode C1 is disposed inside the lens 186, while the electrode C2 is disposed outside the lens 186. The electrodes C1 and C2 also have different sheet resistance. In the eighth embodiment of the present invention, the lens 186 can be made of plastic or glass and can be fabricated by using injection molding technology or by a founding process. The lens 186 includes an upper lens 185 and a bottom lens 187, between which the electrode C1 can be fabricated by using physical vapor deposition or chemical vapor deposition techniques. Subsequently, the liquid crystal layer 184 is formed, and the upper lens 185 and the bottom lens 187 of the lens 186 are sealed. The electrode C2 can be fabricated outside the lens 186 by using physical vapor deposition or chemical vapor deposition techniques. Therefore, when the storage medium 21 is not properly displaced and has a large tilt angle, the voltages of the power source PS1 and PS2 can be determined and the switches SW1-SW4 can be turned on or turned off based on the measured coma aberration. The refractive index of the liquid crystal layer 184 can thus be adjusted for compensating different degrees of coma aberration, thereby improving the accessing performance of the optical system 180.

Figure 19:
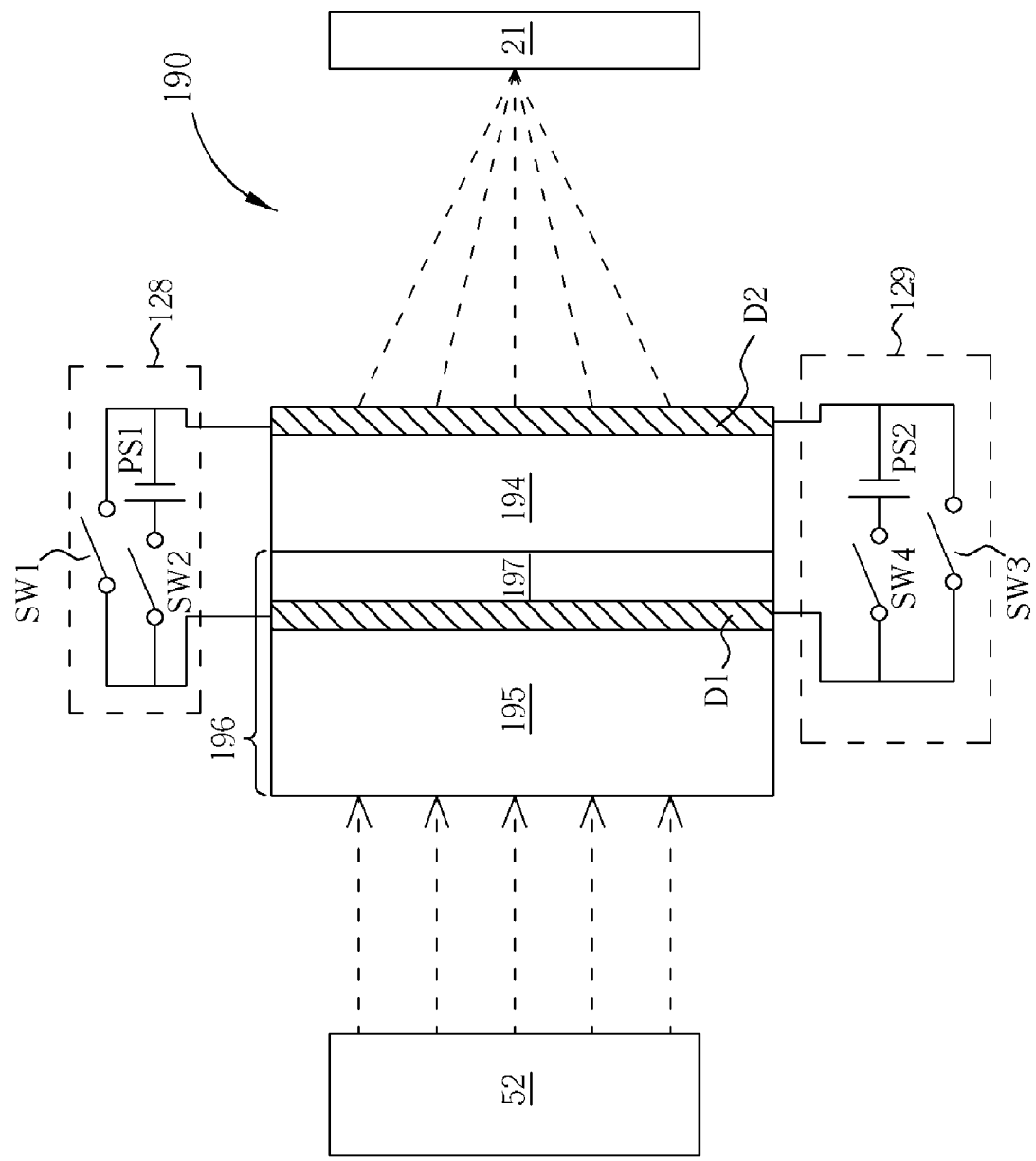
FIG. 19 shows a diagram of an optical system according to a ninth embodiment of the present invention.

A diagram of an optical system 190 according to a nineth embodiment of the present invention is shown in FIG. 19. The optical system 190 includes the light source 52, a liquid crystal layer 194, a lens 196, electrodes D1 and D2, and the power supply units 128 and 129. The optical system 190 differs from the optical system 120 in that the liquid crystal layer 194 and the electrodes D2 are disposed outside the lens 196, while the electrode D1 is disposed inside the lens 196. The electrodes D1 and D2 also have different sheet resistance. In the nineth embodiment of the present invention, the lens 196 can be made of plastic or glass and can be fabricated by using injection molding technology or by a founding process. The lens 196 includes an upper lens 195 and a bottom lens 197, between which the electrode D1 can be fabricated by using physical vapor deposition or chemical vapor deposition techniques. Subsequently, the liquid crystal layer 194 and the electrode D2 are formed, and the upper lens 195 and the bottom lens 197 of the lens 196 are sealed. Therefore, when the storage medium 21 is not properly displaced and has a large tilt angle, the voltages of the power source PS1 and PS2 can be determined and the switches SW1-SW4 can be turned on or turned off based on the measured coma aberration. The refractive index of the liquid crystal layer 194 can thus be adjusted for compensating different degrees of coma aberration, thereby improving the accessing performance of the optical system 190.

Figure 20:
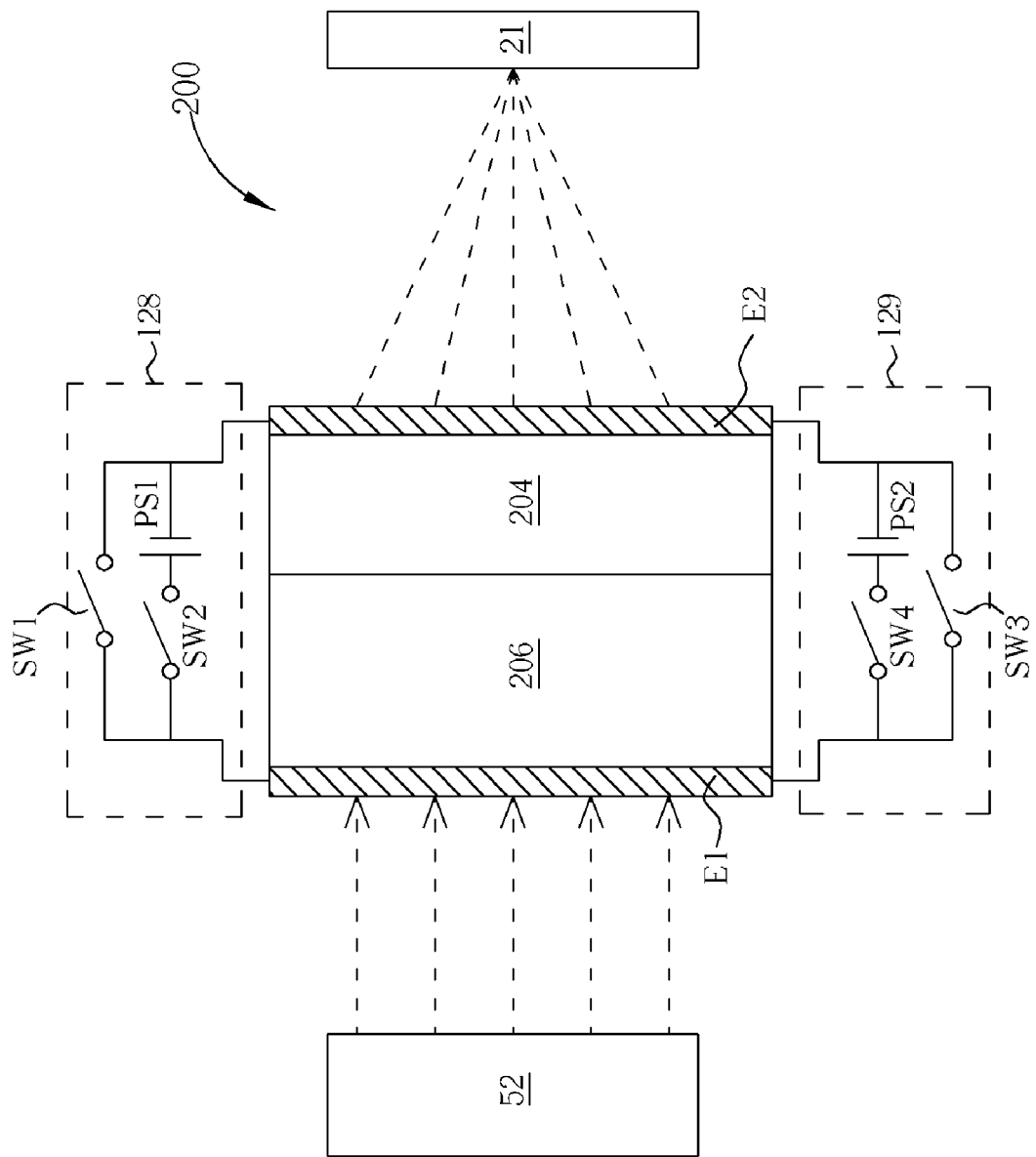
FIG. 20 shows a diagram of an optical system according to a tenth embodiment of the present invention.

A diagram of an optical system 200 according to a tenth embodiment of the present invention is shown in FIG. 20. The optical system 200 includes the light source 52, a liquid crystal layer 204, a lens 206, electrodes E1 and E2, and the power supply units 128 and 129. The optical system 020 differs from the optical system 120 in that the liquid crystal layer 204 and the electrodes E1, E2 are disposed outside the lens 206. The electrodes E1 and E2 also have different sheet resistance. In the tenth embodiment of the present invention, the lens 206 can be made of plastic or glass and can be fabricated by using injection molding technology or by a founding process. The liquid crystal layer 204 and the electrodes E1, E2 can be fabricated outside the lens 206 by using physical vapor deposition or chemical vapor deposition techniques. Therefore, when the storage medium 21 is not properly displaced and has a large tilt angle, the voltages of the power source PS1 and PS2 can be determined and the switches SW1-SW4 can be turned on or turned off based on the measured coma aberration. The refractive index of the liquid crystal layer 204 can thus be adjusted for compensating different degrees of coma aberration, thereby improving the accessing performance of the optical system 200.

The electrodes used in the optical systems 120, 170-200 can include ITO. ITO is a transparent material and does not greatly influence light propagation. Also, the sheet resistance of the electrodes can be adjusted by changing the doping concentration of oxide/tin/indium. In the sixth through tenth embodiments of the present invention illustrated above, the electrodes A1-E1 coupled to the positive terminals of the power sources PS1 and PS2 have higher sheet resistance, while the electrodes A2-E2 coupled to the negative terminals of the power sources PS1 and PS2 have lower sheet resistance. Other electrodes having different sheet resistance relationships can also be used in the present invention for correcting coma aberration flexibly. The optical systems 120, 170-200 can include conventional CD drives, DVD drives, BD drives, HD-DVD drives, or other optical reading apparatuses.

In the present invention, the refractive index of the liquid crystal layer is adjusted by applying different voltages to the electrodes (the first through the fifth embodiments) or by applying voltages to the electrodes with different sheet resistance (the sixth through the tenth embodiments) in order to reduce coma aberration. Since no extra tilt corrector or actuator is required for adjusting the angle of the lens, the optical system of the present invention is relatively inexpensive, simple and can correct coma aberration more flexibly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-converging device capable of correcting aberration comprising:
    a lens for converging light onto a storage medium for accessing data stored in the storage medium;
    a liquid crystal layer integrated with the lens and disposed in an optical path along which the light-converging device converges light onto the storage medium; and
    an electrode set for providing a variable electrical field across the liquid crystal layer, the electrode set comprising:
        a first electrode disposed at a first side of the liquid crystal layer; and
        a second electrode disposed at a second side of the liquid crystal layer, wherein the first and second electrodes have different sheet resistance.

2. The light-converging device of claim 1 wherein:
    the first electrode is parallel to the first side of the liquid crystal layer; and
    the second electrode is not parallel to the second side of the liquid crystal layer.

3. The light-converging device of claim 2 wherein the electrode set further comprises:
    a third electrode disposed at the second side of the liquid crystal layer and parallel to the second side of the liquid crystal layer; and
    a fourth electrode disposed at the first side of the liquid crystal layer and not parallel to the first side of the liquid crystal layer.

4. The light-converging device of claim 3 wherein the first electrode is parallel to the third electrode and the second electrode is parallel to the fourth electrode.

5. The light-converging device of claim 3 further comprising a power source coupled to the four electrodes for providing a voltage difference between the first and second electrodes and for providing a voltage difference between the third and fourth electrodes.

6. The light-converging device of claim 1 wherein the electrode set includes indium tin oxide (ITO).

7. The light-converging device of claim 1 further comprising:
   a first switch coupled between a first end of the first electrode and a first end of the second electrode;
   a second switch having a first end coupled to the first end of the first electrode; and
   a first power source having a first end coupled to a second end of the second switch and a second end coupled to the first end of the second electrode.

8. The light-converging device of claim 7 further comprising:
   a third switch coupled between the second end of the first electrode and the second end of the second electrode;
   a fourth switch having a first end coupled to the second end of the first electrode; and
   a second power source having a first end coupled to a second end of the fourth switch and a second end coupled to the second end of the second electrode.

9. The light-converging device of claim 1 being an object lens of an optical pick-up.

10. An optical reading apparatus capable of correcting aberration comprising:
    a light source for providing light;
    a lens for converging light provided by the light source onto a storage medium for accessing data stored in the storage medium;
    a liquid crystal layer disposed in an optical path between the light source and the storage medium; and
    an electrode set for providing a variable electrical field across the liquid crystal layer, the electrode set comprising:
        a first electrode disposed at a first side of the liquid crystal layer; and
        a second electrode disposed at a second side of the liquid crystal layer, wherein the first and second electrodes have different sheet resistance.

11. The optical reading apparatus of claim 10 wherein:
    the first electrode is parallel to the first side of the liquid crystal layer; and
    the second electrode is not parallel to the second side of the liquid crystal layer.

12. The optical reading apparatus of claim 11 wherein the electrode set further comprises:
    a third electrode disposed at the second side of the liquid crystal layer and parallel to the second side of the liquid crystal layer; and
    a fourth electrode disposed at the first side of the liquid crystal layer and not parallel to the first side of the liquid crystal layer.

13. The optical reading apparatus of claim 12 wherein the first electrode is parallel to the third electrode and the second electrode is parallel to the fourth electrode.

14. The optical reading apparatus of claim 13 further comprising a power source coupled to the four electrodes for providing a voltage difference between the first and second electrodes and for providing a voltage difference between the third and fourth electrodes.

15. The optical reading apparatus of claim 10 further comprising:
    a first switch coupled between a first end of the first electrode and a first end of the second electrode;
    a second switch having a first end coupled to the first end of the first electrode; and
    a first power source having a first end coupled to a second end of the second switch and a second end coupled to the first end of the second electrode.

16. The optical reading apparatus of claim 15 further comprising:
    a third switch coupled between the second end of the first electrode and the second end of the second electrode;
    a fourth switch having a first end coupled to the second end of the first electrode; and
    a second power source having a first end coupled to a second end of the fourth switch and a second end coupled to the second end of the second electrode.

17. The optical reading apparatus of claim 10 wherein the electrode set includes indium tin oxide.

18. The optical reading apparatus of claim 10 further comprising:
    a detector for detecting coma aberration of the light converged onto the storage medium; and
    a control device electrically connected to the electrode set for updating voltages applied to the electrode set according to the coma aberration detected by the detector).

19. The optical reading apparatus of claim 10 wherein the light source includes a laser diode.

20. The optical reading apparatus of claim 10 further including an optical pickup of a high density digital versatile disc (HD-DVD) or a blu-ray disc (BD).

* * * * *